United States Patent [19]
Meisert et al.
[11] 4,280,007
[45] Jul. 21, 1981

[54] PROCESS FOR THE PRODUCTION OF CELLULAR POLYURETHANE ELASTOMERS

[75] Inventors: Ernst Meisert, Leverkusen; Franz-Josef Bohne, Burscheid; Klaus Brecht, Kuerten; Werner Mormann, Leverkusen; Wolfgang Krohn, Cologne; Gerhard Henes, Leverkusen, all of Fed. Rep. of Germany

[73] Assignee: Bayer Aktiengesellschaft, Leverkusen, Fed. Rep. of Germany

[21] Appl. No.: 147,905

[22] Filed: May 8, 1980

[30] Foreign Application Priority Data

May 21, 1979 [DE] Fed. Rep. of Germany ....... 2920502

[51] Int. Cl.[3] ............ C08G 18/14

[52] U.S. Cl. ............ 521/159; 528/64; 528/74

[58] Field of Search ............ 521/159; 528/64, 74

[56] References Cited

U.S. PATENT DOCUMENTS

| | | | |
|---|---|---|---|
| 2,850,464 | 9/1958 | Mitchell | 521/129 |
| 3,718,624 | 2/1973 | Rustad | 528/64 |
| 4,048,105 | 9/1977 | Salisbury | 521/159 |

*Primary Examiner*—Maurice J. Welsh
*Attorney, Agent, or Firm*—Gene Harsh; Joseph C. Gil; Lyndanne M. Whalen

[57] ABSTRACT

The instant invention is directed to a process for the production of a cellular polyurethane elastomer having a density of 0.45 to 0.8 g/cm$^3$, comprising:

(a) preparing a prepolymer having an isocyanate content of 10 to 25% by weight from aromatic polyisocyanates and a portion of one or more polyhydroxyl compounds having a molecular weight of from 400 to 6,000; and (b) reacting said prepolymer with the remainder of said polyhydroxyl compound and water;

wherein the quantity of said water is 0.3 to 1% by weight and the equivalent ratio of isocyanate groups to isocyanate reactive compounds is in the range of 0.95:1 to 1.1:1, characterized in that from 0.1 to 0.8% by weight, based on the whole reaction mixture, of aromatic diprimary diamines having a molecular weight from 108 to 500 are also used in (a) or (b).

11 Claims, No Drawings

PROCESS FOR THE PRODUCTION OF CELLULAR POLYURETHANE ELASTOMERS

BACKGROUND OF THE INVENTION

This invention relates to an improved process for the production of cellular polyurethane elastomers from polyisocyanates, relatively high molecular weight polyhydroxyl compounds and water as chain lengthening and blowing agent. The new process makes it possible for cellular polyurethane elastomers to be produced which have a higher density and higher heat distortion temperature. The process also avoids the excessive evolution of carbon dioxide which occurs in the conventional processes and the consequent high pressure produced in the molds.

Among the polyurethane foams, cellular polyurethane elastomers are distinguished by their substantially higher densities (about 450 to 800 kg/m$^3$) and their improved physical properties. This improves the possibilities of commercial application. Cellular polyurethanes are used, for example, for shoe soles or as buffer elements in mechanical engineering, specifically in the construction of vehicles. They are also becoming increasingly important because of their good thermal stability. The conventional technique for the production of cellular polyurethane elastomers is known from the technical literature, e.g. Kunststoff Handbuch, Volume VII (Polyurethanes), published by Vieweg and Höchtlen, pages 275 to 287). In these processes, relatively high molecular weight polyhydroxyl compounds such as polyesters or polyethers are reacted with diisocyanates to produce isocyanate prepolymers. These prepolymers are then processed into cellular materials by reaction with water to which emulsifiers and, optionally, activators have been added. The water acts as both a chain lengthening agent and a blowing agent.

In order to obtain elastomers with adequate mechanical properties by this prior art process, it is necessary to use a quantity of water as chain lengthening agent which will not result in a cellular elastomer of the desired density (about 450 to 800 kg/m$^3$). The chain lengthening reaction is accompanied by the production of large quantities of excess carbon dioxide so that it is difficult to produce molded articles having the high densities mentioned above. In Kunststoff Handbuch, Volume VII, page 276, it is proposed to overcome this difficulty by using as cross-linking agent, mixtures of water and a conventional glycol chain lengthening agent. Although higher densities can be obtained at low foaming pressures by means of such formulations, the products are inferior in their dynamic characteristics to those foams which have been cross-linked with water alone. Consequently, they have acquired little commercial importance. When cellular polyurethanes which have been produced with such cross-linking agents (mixtures of glycol and water) are used for shoe soles, their thermal stability is insufficient to withstand the heat produced when a fast running athlete stops dead in his tracks. The reason for this is that cellular polyurethane elastomers of this type begin to soften at 65° C. and sometimes soften completely at 120° C. (thermomechanical analysis and torsion vibration test).

If, on the other hand, a diamine chain lengthening agent is substituted for that portion of water which is not required as blowing agent, the cross-linking reaction in the production of cellular polyurethane elastomers proceeds much too rapidly. This causes processing problems which are virtually insurmountable. Also, the products obtained have a very irregular cell structure.

It was, therefore, an object of the present invention to provide a process by which cellular polyurethane elastomers having a relatively high density could be produced by modifying the usual formulations so that excessive gas pressures would not be produced in the foaming process. In addition, the problem of high heat distortion temperature is avoided.

It has now surprisingly been found that these objects can be achieved by adding very small quantities of aromatic diamines in the production of the cellular elastomers (in principle, at any stage of production). The diamines are present in substantially smaller molar quantities than the water and, therefore, make only a minor contribution to the chain lengthening reaction. Considerable improvements in the properties are nevertheless achieved.

DESCRIPTION OF THE INVENTION

The present invention thus relates to a process for the production of a cellular polyurethane elastomer having a density of (450 to 800, preferably 600 to 700 kg/m$^3$). The elastomer is produced from aromatic polyisocyanates (in particular diisocyanates), polyhydroxyl compounds having a molecular weight from 400 to 6,000, (optionally) glycols having a molecular weight from 62 to 250, water and aromatic diprimary diamines.

A prepolymer having an isocyanate content of 10 to 25% by weight is prepared from the polyisocyanates and a portion of the relatively high molecular weight polyhydroxyl compounds in a first stage.

The prepolymer is reacted with the remainder of the relatively high molecular weight polyhydroxyl compounds, glycols and water in a second stage. The second stage may be conducted, optionally, step-wise and, optionally, in the presence of a catalyst.

The quantity of glycols used is from 0 to 4 mol based on 1 mol of the relatively high molecular weight polyhydroxyl compounds. The quantity of water used is from 0.3 to 1% by weight based on the total reaction mixture and calculated over both stages of the process. The equivalent ratio of isocyanate groups to isocyanate reactive compounds is in the range of 0.95:1 to 1.1:1. The aromatic diprimary diamines have a molecular weight of from 108 to 500 and are used in a quantity of from 0.1 to 0.8% by weight, preferably 0.15 to 0.5% by weight based on the total reaction mixture. The aromatic diprimary diamines may be added at either of the stages of the process.

The addition of very small quantities of aromatic diamines makes it possible for molded products to be produced which have a high density, at only a low internal mold pressure and a considerably improved heat distortion temperature. It is assumed that the very rapid reaction between diamine and polyisocyanate gives rise to local accumulations of urea group sequences which function as nucleating agents for the subsequent elimination of carbon dioxide in the reaction between isocyanate and water. This nucleation of urea which has little solubility in the polyol causes uniform formation of the foam, forms nucleating centers for the ureas produced by the isocyanate-water reaction and causes damage to the cell walls so that they are more easily burst by the blowing reaction. Considerable loss of gas occurs even before the molds are closed so that molded products having a higher density and higher compression resistance can be produced even in molds which have comparatively little resistance to pressure.

It is surprisingly found, however, that the effect which is the basis of the invention is not achieved if the compounds used as polyol components already contain substantial quantities (about 2 to 25% by weight) of high molecular weight polyureas or polyisocyanate polyaddition products (in particular polyureas or polyhydrazodicarbonamides) in a dispersed form. Polyols of this type have been described, e.g. in German Offenlegungsschriften No. 2,512,385; 2,513,815; 2,550,796; 2,550,797; 2,550,833 and 2,550,862.

Any polyisocyanates may, in principle, be used for the process according to the invention. Aromatic diisocyanates such as 1,5-naphthylene diisocyanate, 4,4'-diisocyanatodiphenyl methane, 1,3- and 1,4-phenylene diisocyanate, 2,4- and 2,6-tolylene diisocyanate and mixtures thereof are preferred. Particularly preferred is 1,5-naphthylene diisocyanate and more particularly, 4,4'-diisocyanatodiphenyl methane. The latter may, of course, also be used in the form of the usual commercial products which contain small quantities of by-products, e.g. the 2,4'-isomers.

The relatively high molecular weight polyhydroxyl compounds used according to the invention are preferably compounds with molecular weights from 400 to 6,000, in particular 800 to 4,000, which have an average of 2 to 3 hydroxyl groups. Examples include polyesters, polyethers, polythioethers, polyacetals, polycarbonates and polyester amides.

(a) Suitable polyesters with hydroxyl groups include, for example, the reaction products of polyhydric (preferably dihydric alcohols) to which trihydric alcohols may be added and polybasic (preferably dibasic) carboxylic acids. Instead of free polycarboxylic acids, the corresponding polycarboxylic acid anhydrides or polycarboxylic acid esters of lower alcohols or mixtures thereof may be used for the preparation of the polyesters. The polycarboxylic acids may be aliphatic, cycloaliphatic, aromatic and/or heterocyclic. They may be substituted, e.g. with halogen atoms. They may be unsaturated.

The following are mentioned as examples of such carboxylic acids and their derivatives: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumeric acid, dimerized and trimerized unsaturated fatty acids which may be mixed with monomeric unsaturated fatty acids such as oleic acid; dimethyl terephthalate and terephthalic acid-bis-glycol esters. The following are examples of suitable polyhydric alcohols: ethylene glycol, propylene glycol-(1,2) and -(1,3), butylene glycol-(1,4) and -(2,3), hexanediol-(1,6), octanediol-(1,8), neopentyl glycol, 1,4-bis-hydroxymethyl cyclohexane, 2-methyl-1,3-propanediol, glycerol, trimethylol propane, hexanetriol-(1,2,6), butanetriol(1,2,4), trimethylolethane, pentaerythritol, quinitol, mannitol and sorbitol, formitol, methylglycoside; also, diethylene glycol, triethylene glycol, tetraethylene and higher polyethylene glycols, dipropylene glycol and higher polypropylene glycols, dibutylene glycol and higher polybutylene glycols. The polyesters may also contain a proportion of carboxyl end groups. Polyesters of lactones such as ε-caprolactone or of hydroxycarboxylic acids such as ω-hydroxycaproic acid may also be used.

(b) Any polyethers which have preferably 2 to 3 hydroxyl groups may be used. Examples include those prepared by polymerization of epoxides (such as ethylene oxide, propylene oxide, butylene oxide, tetrahydrofuran, styrene oxide or epichlorohydrin) either each on its own (e.g. in the presence of Lewis catalysts such as boron trifluoride) or by addition of these epoxides (preferably ethylene oxide and propylene oxide) either as mixtures or successively, to starting components having reactive hydrogen atoms. Examples of starting components having reactive hydrogen atoms include water, alcohols, ammonia or amines. Examples of alcohols or amines which may be used include ethylene glycol, propylene glycol-(1,3) or -(1,2), trimethylolpropane, glycerol, sorbitol, 4,4'-dihydroxy-diphenyl propane, aniline, ethanolamine or ethylene diamine. It is in many cases preferred to use polyethers which contain predominantly primary hydroxyl groups (up to 90% by weight, based on all of the hydroxyl groups present in the polyether). Polybutadienes which have hydroxyl groups are also suitable for the invention.

(c) Particularly to be mentioned among the polythioethers are the condensation products obtained by reacting thiodiglycol on its own and/or with other glycols, dicarboxylic acids, formaldehyde, aminocarboxylic acids or amino alcohols. The products obtained are polythio mixed ethers, polythio ether esters or polythio ether ester amides, depending on the co-components.

(d) Suitable polyacetals include, for example, the compounds which can be prepared from glycols (such as diethylene glycol, triethylene glycol, 4,4'-dioxethoxydiphenyl dimethylmethane and hexanediol) and formaldehyde. Suitable polyacetals for the purpose of the invention may also be prepared by the polymerization of cyclic acetals, e.g. trioxane (German Offenlegungsschrift No. 1,694,128).

(e) Any polycarbonates with hydroxyl groups may be used. Examples include those which can be prepared by the reaction of diols (such as propanediol-(1,3), butanediol-(1,4) and/or hexanediol-(1,6), diethylene glycol, triethylene glycol, tetraethylene glycol or thiodiglycol) with diarylcarbonates, e.g. with diphenylcarbonate or phosgene (German Auslegeschriften Nos. 1,694,080; 1,915,908 and 2,221,751 and German Offenlegungsschrift 2,605,024).

(f) Suitable polyester amides and polyamides include, for example, the predominantly linear condensates prepared from polybasic saturated and unsaturated carboxylic acids or their anhydrides and polyvalent saturated and unsaturated amino alcohols, diamines, polyamines and mixtures thereof.

(g) Polyhydroxyl compounds already containing urethane or urea groups and modified or unmodified natural polyols such as castor oil may also be used.

Representatives of these compounds which may be used according to the invention have been described, for example, in High Polymers, Volume XVI, "Polyurethanes, Chemistry and Technology" by Saunders-Frisch, Interscience Publishers, New York, London, Volume I, 1962, pages 32–42 and pages 44–54 and Volume II, 1964, pages 5–6 and 198–199 and in Kunststoff-Handbuch, Volume VII, Vieweg-Höchtlen, Carl Hanser Verlag, Munich, 1966, e.g. on pages 45 to 71.

Mixtures of the above-mentioned compounds which contain at least two isocyanate-reactive hydrogen atoms and have a molecular weight from 400 to 10,000 may, of course, also be used, for example mixtures of polyethers and polyesters.

The low molecular weight glycols used may be, for example, the compounds mentioned above in connection with the preparation of the relatively high molecular weight polyols.

According to the invention, small quantities of aromatic diamines are used as chain lengthening agents in addition to water. Examples of suitable aromatic diamines include the bis-anthranilic acid esters according to German Offenlegungsschriften Nos. 2,040,644 and 2,160,590; 3,5- and 2,4-diaminobenzoic acid esters according to German Offenlegungsschrift No. 2,025,900; the diamines with ester groups described in German Offenlegungsschriften No. 1,803,635 (U.S. Pat. Nos. 3,681,290 and 3,736,350); 2,040,650 and 2,160,589; the diamines with ether groups according to German Offenlegungsschriften Nos. 1,770,525 and 1,809,172 (U.S. Pat. Nos. 3,654,364 and 3,736,295), 2-halogen-1,3-phenylene diamines which may be substituted in the 5-position (German Offenlegungsschriften Nos. 2,001,772; 2,025,896 and 2,065,869); 3,3'-dichloro-4,4'-diaminodiphenyl methane; unsubstituted tolylene diamine or tolylene diamine substituted by one or two $C_1$–$C_3$ alkyl groups, e.g. 3,5-diethyl-2,4- or -2,6-diaminotoluene; 4,4'-diaminodiphenyl methane and its derivatives substituted with 1 to 4 $C_1$–$C_4$ alkyl groups; e.g. 3,3'-dimethyl-4,4'-diaminodiphenyl methane; 3,3,5,5'-tetraethyl-4,4'-diaminodiphenyl methane; 3,3'-diisopropyl-4,4'-diaminodiphenyl methane; etc.; 4,4'-diaminodiphenyl disulfides (German Offenlegungsschrift No. 2,404,976); diaminodiphenyl dithioethers (German Offenlegungsschrift No. 2,509,404) and aromatic diamines which are substituted with alkyl thio groups (German Offenlegungsschrift No. 2,638,760). The diamines used are preferably analogous in structure to the diisocyanate used, thus tolylene diamine and substituted tolylene diamines are preferably used for the reaction with 2,4- and 2,6-tolylene diisocyanate whereas prepolymers based on 4,4'-diisocyanatodiphenyl methane are preferably reacted with substituted or unsubstituted diaminodiphenyl methanes. Naphthylene-1,5-diisocyanate is preferably combined with 1,5-diaminonaphthalene but valuable products are also obtained from the combination of 1,5-diaminonaphthalene with 4,4'-diisocyanatodiphenyl methane. It is surprising that even very small quantities of the diamine, preferably 0.15 to 0.5% by weight, based on the total quantity of polyurethane, have the effect required according to the present invention.

In the process according to the invention, the diprimary diamine may be added to the reaction mixture at any stage, e.g. it may be mixed with one of the starting components although it is generally most suitable to add the diamine in the form of a solution in the portion of relatively high molecular weight polyhydroxyl compound used in the second stage of the process. From a process technical point of view, it is frequently advantageous to add a small quantity of the aromatic diisocyanate to this diamine solution in a separate stage of the process so that the molar ratio of diamine to diisocyanate is in the range of 2:1 to 10:9. In that case, owing to the virtually selective reaction between NCO and $NH_2$ groups in the polyol, amine ureas corresponding to the following general formula

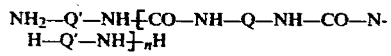

are formed in situ in a quantity of about 0.2 to 1% by weight, based on the polyurethane. In the above formula, n represents an integer from 1 to 11, Q represents the group formed by removal of the NCO groups from the diisocyanate and Q' represents the group formed by removal of the amino groups from the diamine.

According to a second preferred method of operation, the diamine is already added to the isocyanate prepolymer of the first stage of the process, possibly even during its preparation, in which case an isocyanate prepolymer modified with small quantities of urea groups is obtained. According to a variation of this method, the diamine is prepared in situ in the prepolymer by using an equivalent quantity of water instead of the diamine so that the diisocyanate is converted into the corresponding diamine by saponification.

Known catalysts may also be used according to the invention to accelerate the reaction, e.g. tertiary amines such as triethylamine, tributylamine, N-methylmorpholine, tetramethylethylene diamine, 1,4-diazabicyclooctane, N,N-dimethyl benzylamine, N,N-diethyl benzylamine, imidazole derivatives, bis-(dialkylamino) alkyl ethers or organometallic compounds, in particular organic tin compounds.

Surface active additives such as emulsifiers and foam stabilizers are not necessary for producing the cellular elastomers but may be added, if desired, to improve the structure of the foam. Oxalkylated fatty alcohols or alkali metal or ammonium salts of sulfonic acids may be used as emulsifiers. Flameproofing agents, dyes, stabilizers and bacteriostatic substances may be added depending on commercial requirement.

The products of the process may be used, for example, as buffers, spring elements, wheel linings, seals or for the soles of extra hardwearing sports shoes.

The following examples serve to illustrate the process according to the invention. Quantities given should be understood as parts by weight or percentages by weight unless otherwise indicated. The experiments were carried out in stirrer and mixing machines of the type normally used for processing liquid polyurethane systems (SK machine of Hennecke, BRD, in Example 2, shoe soling machine of Desma, BRD, in Example 1 and shoe soling machine EMB of BASF, BRD, in Example 3).

Among the various properties, the gross densities of the free foams were compared in the examples. The "free foams" were produced by introducing the reactive mixture into paper cups having a capacity of 300 ml. When the foam has solidified, the portion which had risen above the top of the cup was off and the gross density of the product was determined by weighing the contents of the cup.

A molded product was produced in the form of a plate. The aluminum mold in which it was formed had a square base measuring 200×200 mm and a height of 10 mm. The top was closed by an aluminum plate pressed onto the two cm wide edge of the mold by means of toggle levers. The gross density of the molded product was determined according to DIN 53 420, its tensile strength and elongation at break according to DIN 53 504, its impact elasticity according to DIN 53 512, its Shore hardness A according to DIN 53 505 and its tear propagation resistance according to DIN 53 507.

EXAMPLES

Example 1

A prepolymer, prepared at 40° to 80° C. from 60 parts of 4,4'-diisocynato-diphenyl methane and 40 parts of a linear butanediol-1,4/ethanediol polyadipate (molecular weight 2,000) was used for all of the Examples 1a to 1e. The isocyanate content of this prepolymer was 19%.

(a) Comparison Experiment

A mixture of 100 parts of the above-mentioned linear butanediol/ethanediol-polyadipate, 0.6 parts of water and 0.5 parts of diazabicyclooctane was prepared. 100 parts of this polyol mixture were mixed with 36 parts of the prepolymer and the mixture was introduced into the mold. In the production of plates having a density of 600 kg/m$^3$, considerable quantities of the reactive foam were expelled between the mold and its lid. The gross density of the free foam was 142 kg/m$^3$. The other data are summarized in Table 1.

(b) Process according to the invention

A mixture of 100 parts of the linear polyadipate, 0.6 parts of water, 0.5 parts of diazabicyclooctane and 0.5 parts of 4,4'-diaminodiphenyl methane was prepared. 100 parts of this polyol mixture were reacted with 37.3 parts of the prepolymer. The free foam was found to have a density of 323 kg/m$^3$. Molded parts having a gross density of 600 kg/m$^3$ could be produced without any of the mixture being expelled from the mold. Other data: see Table 1.

(c) Comparison Experiment a mixture of 100 parts of the linear polyadipate, 0.45 parts of water, 7.7 parts of butane-1,4-diol and 0.6 parts of diazabicyclooctane was prepared. 100 parts of this polyol mixture were reacted with 66 parts of the prepolymer. The density of the free foam was 255 kg/m$^3$. Molded parts having a gross density of 600 kg/m$^3$ could be produced easily but both the heat distortion temperature and the low temperature characteristics were very poor. The measured data are given in Table 1.

(d) Process according to the invention 0.5 parts of diaminodiphenyl methane were dissolved in 100 parts of the linear polyadipate. 0.32 parts of 4,4'-diphenyl methane diisocyanate were stirred into the solution, heated to 50° C. The solution became very cloudy. 1 part of water and 0.4 parts of diazabicyclooctane were added to this modified polyol. 100 parts of this polyol formulation were reacted with 47 parts of the prepolymer. The density of the free foam was 265 kg/m$^3$. Molded products having a gross density of 600 kg/m$^3$ could easily be produced in the plate mold described above. The results of the other tests are summarized in Table 1.

(e) Comparison Experiment

A polyol formulation was prepared from 100 parts of the linear polyadipate, 13 parts of butane-1,4-diol, 0.4 parts of water and 0.52 parts of diazabicyclooctane. 100 parts of this polyol formulation were reacted with 84 parts of the prepolymer. The gross density of the free foam was 270 kg/m$^3$. Molded parts having a gross density of 600 kg/m$^3$ could easily be produced in the plate mold described above, but their stability at high and low temperatures was very poor. The results of measurements are summarized in Table 1.

A particularly striking feature of Table 1 is the substantially higher thermal stability of products produced according to the invention.

Example 2

The same prepolymer was used in Examples 2a to 2e as in Example 1. Various amines were compared in their effectiveness.

(a) Process according to the invention

A polyol mixture was prepared from 100 parts of the linear polyadipate, 0.5 parts of water, 0.5 parts of diazabicyclooctane and 0.86 parts of 3,3'-dicarbethoxy-4,4'-diaminodiphenyl methane. 100 parts of this polyol mixture were reacted with 35 parts of the prepolymer. The density of the free foam was 190 kg/m$^3$. Molded articles having a gross density of 500, 600 and 700 kg/m$^3$ could be produced without expulsion of part of the reaction mixture from the mold. Results of measurements: see Table 2.

(b) Comparison Experiment 100 parts of the linear polyadipate were mixed with 0.5 parts of water, 0.5 parts of diazabicyclooctane and 0.9 parts of N-methylethanolamine. 100 parts by weight of this polyol mixture were reacted with 80 parts by weight of the prepolymer. The density of the free foam was 139 kg/m$^3$. Only products with a gross density of up to 550 kg/m$^3$ could be produced in the given mold without expulsion. Results of measurements: see Table 2.

(c) Process according to the invention 100 parts by weight of the linear polyadipate were mixed with 0.5 parts of water, 0.5 parts of diazabicyclooctane and 0.2 parts by weight of 1,5-naphthylene diamine. 100 parts by weight of this polyol mixture were reacted with 35 parts by weight of the prepolymer. The gross density of the free foam was 230 kg/m$^3$. Molded parts could be produced with a gross density of 500 to 700 kg/m$^3$ without expulsion. Results of measurements: see Table 2.

(d) Comparison Experiment 100 parts by weight of the linear polyadipate, 0.5 parts by weight of water and 0.5 parts by weight of diazabicyclooctane were mixed together. 100 parts by weight of this mixture were reacted with 35 parts by weight of the prepolymer. The gross density of the free foam was 160 kg/m$^3$. Molded parts having a gross density of 600 kg/m$^3$ could only be produced with considerable expulsion in the given plate mold. The other results of measurements are shown in Table 2.

(e) Process according to the invention 100 parts by weight of the linear polyadipate, 0.5 parts by weight of water and 0.5 parts by weight of diazabicyclooctane were mixed together and to this mixture was added 0.86 parts by weight of a mixture of 3,3',5,5'-tetraethyl-4,4'-diaminodiphenyl methane and 3,3',5,5'-tetraisopropyl-4,4'-diaminodiphenyl methane (molar ratio 1:1). 100 parts by weight of this polyol mixture were reacted with 35 parts by weight of the prepolymer. The density of the free foam was 195 kg/m$^3$. Molded parts could easily be produced with gross densities of 500, 600 and 650 kg/m$^3$. A slight amount of expulsion was observed only when producing molded parts with a gross density of 700 kg/m$^3$. For results of measurements, see Table 2.

Example 3

A prepolymer was prepared at 40° to 80° C., by reacting a mixture of 80 parts by weight of a linear polypropylene glycol polyether (molecular weight 2.000) and 20 parts by weight of a branched chain polyether of trimethylol propane and propylene oxide (molecular weight 3.000) with 128 parts by weight of 4,4'-diphenylmethane diisocyanate. The isocyanate content of this prepolymer was 17%.

(a) Comparison Experiment

A polyol mixture was prepared from 80 parts by weight of a linear polypropylene glycol ether containing grafted ethylene oxide in end positions (molecular weight 4,000), 20 parts by weight of a trifunctional polypropylene glycol ether grafted with ethylene oxide in end positions (molecular weight 4,000), 1 part of water, 0.2 parts by weight of diazabicyclooctane, 0.4 parts by weight of N-dimethyl-N-formyl propylene diamine and 0.03 parts by weight of dibutyl tin dilaurate. 100 parts by weight of this polyol mixture were reacted with 42 parts by weight of the isocyanate prepolymer. The gross density of the free foam was 128 kg/m$^3$. The free foam showed signs of severe shrinkage. A dimensionally stable molded product could not be obtained.

(b) Process according to the invention 0.5 parts by weight of 4,4'-diaminodiphenyl methane were added to the polyol mixture of Example 3a which was then reacted with 43.5 parts by weight of the prepolymer. A free foam having a gross density of 212 kg/m$^3$ was obtained. It showed no signs of shrinkage. Molded products could be produced with gross densities of 300 to 400 kg/m$^3$.

(c) Process according to the invention 0.5 parts by weight of 4,4'-diaminodiphenyl ether were added to the polyol mixture from Example 3a. A nonshrinking free foam was obtained after the reaction with prepolymer, and highly elastic molded products having gross densities of 400 kg/m$^3$ could be produced.

TABLE 1

| Example | | 1a | 1b | 1c | 1d | 1e |
|---|---|---|---|---|---|---|
| Gross density: | | | | | | |
| Free foam | (kg/m$^3$) | 142 | 323 | 255 | 265 | 270 |
| Molded part | (kg/m$^3$) | 600 | 600 | 600 | 600 | 600 |
| Hardness | (Shore A) | ca.30 | 46 | 45 | 48 | 52 |
| Tensile strength | (MPa) | 5.79 | 9.23 | 7.20 | 9.40 | 12.5 |
| Elongation at break | (%) | 628 | 716 | 550 | 698 | 468 |
| Tear propagation resistance | (KN/m) | 5.0 | 10.7 | 8.16 | 11.2 | 12.0 |
| Elasticity | (%) | 68 | 68 | 48 | 72 | 43 |
| Damping maximum (1) | (° C.) | −28 | −28 | −15 | −26 | −12 |
| Thermomechanical analysis: | | | | | | |
| Onset of softening | (° C.) | 89 | 137 | 65–72 | 136 | 79 |
| Complete melting | (° C.) | 156 | 166 | 137 | 159 | 140 |

(1) Torsion vibration test according to DIN 53 445.

TABLE 2

| Example | | 2a | 2b | 2c | 2d | 2e |
|---|---|---|---|---|---|---|
| Gross density: | | | | | | |
| Free foam | (kg/m$^3$) | 190 | 139 | 230 | 160 | 195 |
| Molded part | (kg/m$^3$) | 600 | 550 | 600 | 600 | 600 |
| Hardness | (Shore A) | 41 | 48 | 45 | 41 | 42 |
| Tensile strength | (MPa) | 7.29 | 6.34 | 7.12 | 9.5 | 7.19 |
| Elongation at break | (%) | 679 | 578 | 637 | 654 | 630 |
| Tear propagation resistance | (KN/m) | 7.5 | 12.3 | 8.8 | 7.9 | 7.7 |
| Elasticity | (%) | 61 | 42 | 62 | 62 | 59 |
| Bending endurance test (1) | | 40,000 neg. | 17,000 destroyed | 40,000 neg. | 40,000 neg. | 40,000 neg. |

(1) The bending endurance test was carried out according to DIN 53 522 (sheet 3). The test was stopped after bending the sample 40,000 times. No increase in the width of the tear = neg.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a cellular polyurethane elastomer having a density of 300 to 800 kg/m$^3$, comprising;

(a) preparing a prepolymer having an isocyanate content of 10 to 25% by weight from aromatic polyisocyanates and a portion of one or more polyhydroxyl compounds having a molecular weight of from 400 to 6,000; and (b) reacting said prepolymer with the remainder of said polyhydroxyl compound and water;

wherein the quantity of said water is 0.3 to 1% by weight and the equivalent ratio of isocyanate groups to isocyanate reactive compounds is in the range of 0.95:1 to 1.1:1, characterized in that from 0.1 to 0.8% by weight, based on the whole reaction mixture, of aromatic diprimary diamines having a molecular weight from 108 to 500 are also used in (a) or (b).

2. The process of claim 1, further comprising the addition of glycols, having a molecular weight of 62 to 250, in the reaction of step (b), wherein the quantity of glycols is 0 to 4 mol, based on 1 mol of said polyhydroxyl compound based on the whole reaction mixture calculated over steps (a) and (b).

3. The process of claim 2, wherein the reaction of step (b) is conducted in the presence of catalyst.

4. The process of claim 2, wherein said diamine is used in the form of a solution in the polyhydroxyl compound in step (b).

5. The process of claim 4, wherein said diamine is converted in situ in the polyhydroxyl compound of step (b) into an amine urea corresponding to the following general formula:

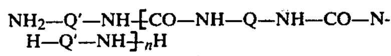

in which n is an integer from 1 to 11,

Q represents the group obtained by removal of the NCO groups from the diisocyanate and Q' represents the group obtained by removal of the amino groups from the diamine, by reacting it with an aromatic diisocyanate in a molar ratio of diamine to diisocyanate in the range of 2:1 to 10:9.

6. The process of claim 2, wherein said diamine is added to said isocyanate prepolymer of step (a), optionally during preparation of the prepolymer.

7. The process of claim 2, wherein said aromatic polyisocyanate is 4,4'-diphenylmethane diisocyanate and said aromatic diamine is 4,4'-diaminodiphenylmethane which may be substituted on the nucleus.

8. The process of claim 2, wherein said aromatic polyisocyanate is 1,5-naphthylene diisocyanate and said aromatic diamine is 1,5-naphthylene diamine.

9. The process of claim 2, wherein said aromatic diprimary diamines are used in an amount of 0.15 to 0.5% by weight, based on the total reaction mixture.

10. The process of claim 1, wherein the density of said elastomer is 0.6 to 0.7 g/cm$^3$.

11. The process of claim 2, wherein said polyhydroxyl compound and said glycols, if any, do not contain any polyureas or polyisocyanate polyaddition products.

* * * * *